US009827821B2

(12) United States Patent
Kettenberger

(10) Patent No.: US 9,827,821 B2
(45) Date of Patent: Nov. 28, 2017

(54) VEHICLE WHEEL SUSPENSION OF CONTROL BLADE DESIGN

(71) Applicant: Bayerische Motoren Werke Aktiengesellschaft, Munich (DE)

(72) Inventor: Johann Kettenberger, Winhoering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/660,083

(22) Filed: Mar. 17, 2015

(65) Prior Publication Data

US 2015/0183285 A1    Jul. 2, 2015

Related U.S. Application Data

(63) Continuation of application No. PCT/EP2013/066227, filed on Aug. 1, 2013.

(30) Foreign Application Priority Data

Sep. 19, 2012  (DE) .................. 10 2012 216 822

(51) Int. Cl.
*B60G 3/28* (2006.01)
*B60G 11/32* (2006.01)
*B60G 7/00* (2006.01)

(52) U.S. Cl.
CPC .............. *B60G 3/285* (2013.01); *B60G 7/001* (2013.01); *B60G 11/32* (2013.01);
(Continued)

(58) Field of Classification Search
CPC ........ B60G 2200/182; B60G 2200/124; B60G 2200/15; B60G 7/001; B60G 3/285
(Continued)

(56) References Cited

U.S. PATENT DOCUMENTS 4,143,888 A    3/1979   Heinig
4,509,774 A *  4/1985   Booher .................. B29C 70/52
                                                      267/47
(Continued)

FOREIGN PATENT DOCUMENTS

CN       1500664 A    6/2004
CN     102395479 A    3/2012
(Continued)

OTHER PUBLICATIONS

German Search Report dated Jul. 1, 2013 with partial English-language translation (Ten (10) pages).
(Continued)

*Primary Examiner* — James A English
(74) *Attorney, Agent, or Firm* — Crowell & Moring LLP

(57) ABSTRACT

A vehicle wheel suspension of a control blade design has three wheel-guiding control arms essentially oriented in the transverse direction of the vehicle and one longitudinal control arm fastened rigidly to the wheel carrier and barely limiting its transverse movement with respect to the vehicle body. The longitudinal control arm is constructed of a fiber composite material and is also rigidly fastened to the vehicle body and thereby takes over the function of a main spring between the wheel carrier and the vehicle body. Other than stop springs integrated in a vibration damper, no further main spring element is provided between the wheel carrier and the vehicle body. The above-mentioned longitudinal control arm may be formed by two, in a wide area, individual control arm parts, which are essentially situated in a common vertical plane, specifically such that the first control arm part of the longitudinal control arm is fastened to the wheel carrier above the wheel center, and second control arm part is fastened to the wheel carrier below the wheel center. The two control arm parts, guided together with their
(Continued)

other ends in a common fastening element, are, as required, slightly elastically fastened to the vehicle body.

6 Claims, 1 Drawing Sheet

(52) U.S. Cl.
CPC .. *B60G 2200/182* (2013.01); *B60G 2206/124* (2013.01); *B60G 2206/15* (2013.01); *B60G 2206/7101* (2013.01)

(58) Field of Classification Search
USPC .................. 280/124.131, 124.133, 124.128
See application file for complete search history.

(56) References Cited

U.S. PATENT DOCUMENTS

| | | | | |
|---|---|---|---|---|
| 4,690,426 A * | 9/1987 | Kubo | ............... | B60G 3/202 280/124.131 |
| 4,753,456 A * | 6/1988 | Booher | ............... | B29C 70/52 280/124.134 |
| 4,754,992 A * | 7/1988 | Asanuma | ............... | B60G 3/22 280/124.135 |
| 4,790,560 A * | 12/1988 | Asanuma | ............... | B60G 3/22 280/124.128 |
| 4,815,755 A * | 3/1989 | Takata | ............... | B60G 3/22 280/124.128 |
| 4,832,363 A * | 5/1989 | Mitobe | ............... | B60G 3/202 280/124.128 |
| 4,930,805 A | 6/1990 | Takata et al. | | |
| 4,978,131 A * | 12/1990 | Edahiro | ............... | B60G 3/26 280/124.139 |
| 5,000,477 A | 3/1991 | Minakawa et al. | | |
| 5,009,449 A * | 4/1991 | Edahiro | ............... | B60G 3/22 280/124.133 |
| 5,071,156 A | 12/1991 | Kanai et al. | | |
| 5,340,146 A * | 8/1994 | Kato | ............... | B60G 3/202 280/124.135 |
| 6,382,649 B1 | 5/2002 | Albers et al. | | |
| 6,945,547 B2 * | 9/2005 | Ackley | ............... | B60G 3/18 280/124.143 |
| 7,431,315 B2 * | 10/2008 | Jargowsky | ............... | B60G 3/202 280/124.128 |
| 2003/0122339 A1 * | 7/2003 | Drabon | ............... | B60G 7/001 280/124.134 |
| 2011/0291379 A1 | 12/2011 | Yanagida | | |
| 2014/0035251 A1 * | 2/2014 | Glanzer | ............... | B60G 7/006 280/124.136 |
| 2015/0343868 A1 * | 12/2015 | Stenzenberger | ....... | B60G 3/285 280/124.11 |
| 2015/0375588 A1 * | 12/2015 | Czerr | ............... | B60G 3/202 280/124.135 |

FOREIGN PATENT DOCUMENTS

| | | |
|---|---|---|
| DE | 39 24 950 A1 | 2/1990 |
| DE | 39 26 665 A1 | 2/1990 |
| DE | 199 33 432 B4 | 7/2005 |
| DE | 10 2011 112 053 A1 | 3/2012 |
| EP | 0 178 771 A1 | 4/1986 |
| EP | 0 136 563 B1 | 10/1989 |
| EP | 1 419 909 A2 | 5/2004 |
| GB | 2 182 001 A | 5/1987 |
| JP | 63-101113 A | 5/1988 |
| JP | 1-278813 A | 11/1989 |
| JP | 2-38108 A | 2/1990 |
| JP | 2-38116 A | 2/1990 |
| JP | 3-25304 U | 3/1991 |
| JP | 3-25305 U | 3/1991 |
| JP | 11-208233 A | 8/1999 |
| JP | 2005-22424 A | 1/2005 |
| JP | 2011-246047 A | 12/2011 |

OTHER PUBLICATIONS

International Search Report (PCT/ISA/210) dated Oct. 16, 2013 with English-language translation (Six (6) pages).
Chinese Office Action issued in counterpart Chinese Application No. 201380046251.7 dated Feb. 26, 2016 with English-language translation (ten (10) pages).
Chinese-language Office Action issued in counterpart Chinese Application No. 201380046251.7 dated Nov. 10, 2016 with English translation (13 pages).
German translation of Japanese-language Office Action issued in counterpart Japanese Application No. 2015-531502 dated Oct. 26, 2016 (5 pages).
Chinese Office Action issued in counterpart Chinese Application No. 201380046251.7 dated May 16, 2017 with English-language translation (thirteen (13) pages).

* cited by examiner

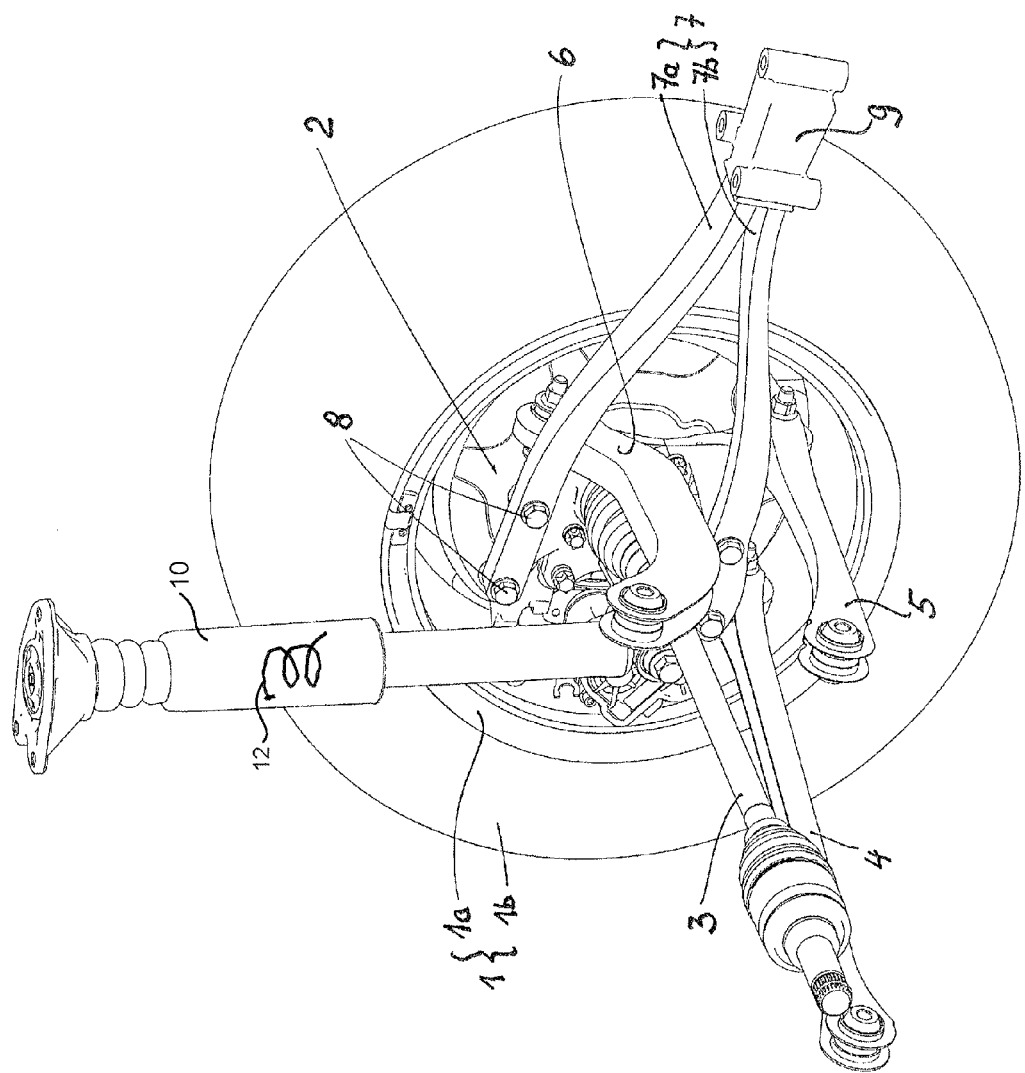

VEHICLE WHEEL SUSPENSION OF CONTROL BLADE DESIGN

CROSS REFERENCE TO RELATED APPLICATIONS

This application is a continuation of PCT International Application No. PCT/EP2013/066227, filed Aug. 1, 2013, which claims priority under 35 U.S.C. §119 from German Patent Application No. 10 2012 216 822.2, filed Sep. 19, 2012, the entire disclosures of which are herein expressly incorporated by reference.

BACKGROUND AND SUMMARY OF THE INVENTION

The invention relates to a vehicle wheel suspension of a control blade design having three wheel-guiding control arms essentially oriented in the transverse direction of the vehicle, as well as having one longitudinal control arm fastened essentially rigidly to the wheel carrier and barely limiting its transverse movement with respect to the vehicle body. Concerning the state of the art, in addition to EP 0 136 563 B1 or DE 102011 112 053 A1, reference is made to DE 199 33 432 B4. While the last-mentioned document shows a special wheel suspension having a control arm made of a composite fiber material and designed as a leaf spring suspension, the two first-mentioned documents show vehicle wheel suspensions of the control blade design.

In the further development of rear axles, particularly for passenger cars, it is increasingly necessary to reduce installation space and weight while making the driving dynamics as good as possible. Furthermore, it is advantageous to have additional flexibility present for the arrangement of the individual axle components, so that, for example, different designs of the rear part of a vehicle class can be presented or different chassis control systems can optionally be integrated in a simple manner. It is an object of the present invention to provide an improvement in this respect for a control blade axle known to the person skilled in the art.

This and other objects are achieved by a vehicle wheel suspension of the control blade design having three wheel-guiding control arms essentially oriented in the transverse direction of the vehicle, as well as having one longitudinal control arm fastened essentially rigidly to the wheel carrier and barely limiting its transverse movement with respect to the vehicle body. The longitudinal control arm is essentially rigidly fastened to the vehicle body and thereby also takes over the function of the main spring between the wheel carrier and the vehicle body.

First, the term "essentially rigid fastening" will be briefly discussed, which is provided for the above-mentioned longitudinal control arm at the wheel carrier and at the vehicle body. This term has the purpose of expressing that, with respect to the element carrying it, i.e. with respect to the wheel carrier and with respect to the vehicle body, the control arm has no degree of freedom in the actual sense in the respective fastening point, so that this is not a joint of a somewhat different type but virtually a rigid connection. However, particularly for increasing the rolling comfort and/or for improving the acoustics in the vehicle, it may be recommended to fasten the longitudinal control arm slightly elastically to the vehicle body and/or to the wheel carrier. A defined degree of freedom will also not exist then and the above-mentioned elastic bearing takes over particularly a damping function mechanically with respect to brief hard shocks and/or acoustically with respect to otherwise transmitted rolling noises. By means of such a slightly elastic fastening, the longitudinal control arm is then "essentially rigidly" fastened to the wheel carrier and/or to the vehicle body.

With respect to the invention, it is known that good driving dynamics are represented by way of a so-called control blade axle with three wheel-guiding control arms oriented essentially in the transverse vehicle direction and a control arm oriented essentially in the longitudinal direction of the vehicle, which control arm is fastened to the wheel carrier and whose freedom of movement in the transverse direction of the vehicle is not significantly limited, at least to the extent that the latter can move because the transverse control arms continue to guide the wheel carrier.

Various arrangements are known for a main spring still required in addition to the wheel-guiding control arms, by which the vehicle body is proportionately supported at the wheel carrier. Thus, in European Patent Document EP 0 136 563 B1 first mentioned above, the main spring is supported directly at the wheel carrier, while, in the case of the initially further mentioned German Patent Document DE 102011 112 053 A1, the main spring (not shown there) is most probably supported on a rearward lower transverse control arm. The latter therefore has to have a relatively massive construction, which requires a relatively large amount of space and also significantly increases the weight of the vehicle. Furthermore, particularly in the case of driven axles, there is a limitation with respect to the possible arrangement of that transverse control arm that carries the main spring in order to achieve sufficient distance between the main spring and the drive shaft of the wheel. If, in contrast, according to an alternative design, the main spring is supported directly on the wheel carrier, the above-mentioned disadvantages do not exist, but the main spring would project very far upward viewed in the vertical direction, which is disadvantageous in the case of rear axles, particularly of passenger cars, for constituting a rear part of a vehicle with a large trunk, a large loading width and a favorable support structure.

In the present case, it is therefore suggested to integrate the main spring function in the longitudinal control arm of a so-called sword arm axle, which, in the state of the art, normally viewed in the transverse direction of the vehicle, has a relatively flexible construction. This longitudinal control arm, which in the state of the art is flexible in the transverse direction of the vehicle, with its end facing away from the wheel carrier is, swivelably about the transverse axis of the vehicle, fastened directly or indirectly to the vehicle body, in order to permit a compression and rebound travel of the wheel, i.e. its vertical movement. According to the present invention, this longitudinal control arm is now essentially rigidly fastened not only to the wheel carrier, but also to the vehicle body (except for a possibly slight elastic bearing), and, when viewed in the transverse direction of the vehicle, under a corresponding force effect, itself can be significantly elastically deformed such that the wheel can be displaced in the vertical direction by way of its usual spring travel or wheel travel. By way of this elastic deformation, which can be constituted under the effect of force, this longitudinal control arm can therefore at least proportionately take over the function of the main spring.

While the functional integration of one of the supporting springs in the longitudinal control arm according to the invention can, in principle, be constituted by use of different materials and further developments of the longitudinal control arm as well as manufacturing processes for this longitudinal control arm, additional weight-related advantages are obtained according to the invention, if this above-mentioned deformability of the longitudinal control arm, while the shaping is suitable, is generated in that this longitudinal control arm is constructed of a composite fiber material. When the shaping is suitable, by means of such an implementation, advantageously, the required elasticity in the transverse direction of the vehicle can also be more easily constituted.

A longitudinal control arm according to the invention in a vehicle rear axle of the control blade design therefore significantly limits the mobility of the wheel carrier only in the longitudinal direction of the vehicle, whereas its mobility in the transverse direction of the vehicle is barely limited by a longitudinal control arm according to the invention and its mobility in the vertical direction is limited only to an extent that this longitudinal control arm at least proportionately takes over the function of a main spring clamped in between the wheel carrier and the vehicle body. Therefore, in addition to the longitudinal control arm according to the invention, an additional spring element may also be clamped in at a vehicle wheel suspension according to the invention between the vehicle body and (finally) the wheel carrier, which then, however, can have significantly smaller dimensions than in the case of the conventional state of the art (of a control blade design axle). A longitudinal control arm according to the invention will, however, preferably completely take over the function of an otherwise customary main spring, so that, according to the state of the art, only a compression stop spring and/or rebound stop spring is still provided, which is integrated in a vibration damper functionally connected parallel to the main spring. This compression stop spring and/or rebound stop spring acts or can act between the wheel carrier and the vehicle body.

In order to realize different spring rates of the main spring as well as for the adaptation to different vehicle weights in the design position, it may be helpful that the longitudinal control arm according to the invention is constructed with several control arm branches, particularly when the geometrical and material-related scope of design options is not sufficient using a single control arm or control arm branch, for meeting the required application range of the axle. The above-mentioned longitudinal control arm can therefore be formed by two or more, in a wide area, individual control arm parts, which are preferably situated essentially in a common vertical plane, whereby, on the one hand, a considerable degree of freedom exists with respect to the geometrical design of this longitudinal control arm and therefore also its suspension characteristics and other features. On the other hand, particularly when the first control arm part of the longitudinal control arm is situated above and the second control part is situated below the wheel center at the wheel carrier, a wheel drive shaft can extend between these two control arm parts through to the hub of the wheel carrier. When these two (or more) control arm parts, guided together with their other ends, are fastened in a common fastening element to the vehicle body, this reduces the building expenditures and simplifies the mounting process for a wheel suspension according to the invention.

In order to optimize the rolling comfort and the rolling acoustics with respect to the longitudinal control arm according to the invention, it may be helpful for the vehicle-body-side end of the longitudinal control arm to be elastically disposed or fastened, for example, in rubber. By means of such a slightly elastic fastening or bearing, it is further contemplated to shape the introduction of force onto the longitudinal control arm to be flat, whereby undesirable point loads or line loads are avoided. For this purpose, rounding-off of a fastening element for the longitudinal control arm can be used in the area of an opening of this element, into which the longitudinal control arm is inserted. Furthermore, an elastic fastening can seal off the body-side fixation point and the entering of water, dirt and particles can thereby be prevented. Such a slightly elastic fastening can be constituted particularly easily when the body-side end of the longitudinal control arm is vulcanized into the fastening element to be rigidly connected with the vehicle body. If the introduction area of the fastening element for the longitudinal control arm is in this case provided with diagonal walls, which taper toward the entrance opening for the longitudinal control arm, it is easily ensured that even in the case of a high longitudinal force load against the traveling direction toward the rear, as it may occur, for example, when braking or driving over a pothole, the longitudinal control arm and the fastening element will not separate from one another. In order to meet the highest demands with respect to rolling comfort and acoustics or, if required, eliminate operational stability problems at the wheel-carrier-side fastening of the longitudinal control arm, such a slightly elastic fastening of the longitudinal control arm can also be provided at the wheel carrier.

In the case of a vehicle wheel suspension of the control blade type according to the invention, a braking torque resulting from a braking operation during forward driving is superimposed at the body-side fixation point of the longitudinal control arm in the same direction on the clamping-in torque from the wheel load, which may result here in a compensation of the rebounding movement at the rear axle usually caused by the braking. In this case, a rebounding movement can be compensated partially, completely or even be overcompensated as a function of the geometrical conditions. In comparison to a classically implemented sword arm axle, as illustrated, for example, in EP 0 136 563 B1, this means that, in the case of a wheel suspension according to the invention, the body-side fixation point of the longitudinal control arm can be selected to be lower, without having to fear disadvantages in the anti-dive behavior of the vehicle. This results in additional installation space advantages, which permit an advantageous and therefore weight-optimized structural design of the vehicle body.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic diagram in a perspective view of an embodiment according to the invention.

DETAILED DESCRIPTION OF THE DRAWING

In this case, reference number 1 indicates the left rear wheel of a passenger car in its entirety, having a tire 1b placed on a wheel rim 1a. As usual, the rim 1a is equipped with spokes, which are not visible here because of the view from the interior, and by way of a hub is fastened to a wheel carrier 2, being rotatable with respect to the wheel carrier 2. A drive shaft 3 leads toward the hub rotatably disposed on the wheel carrier 2, so that this rear wheel/wheel 1 can be driven.

Finally, the wheel carrier 2 is guided by way of a total of four control arms 4, 5, 6, 7 with respect to the vehicle body; i.e. these four control arms 4-7, which are fastened with their one end in a suitable manner at the wheel carrier 2, are appropriately fastened with their other end, which is free in the figures, either directly or by way of a customary (not shown) rear axle carrier, to the also not shown vehicle body.

The above-mentioned four control arms are three control arms 4, 5, 6 oriented essentially in the transverse direction of the vehicle, of which the control arms 4 and 5 are linked to the wheel carrier 2 below as well as in front of or behind the wheel center, and the control arm 6 is linked to the wheel carrier 2 above and, viewed in the traveling direction of the vehicle, in front of the wheel center. These three also so-called transverse control arms 4, 5, 6 are each appropriately flexibly linked to the wheel carrier 2 as well as to the rear-axle carrier or vehicle body and have an essentially rod-shaped design. These transverse control arms 4-6 advantageously only have to be designed for transmitting forces in the longitudinal direction of the control arms because, differently than often implemented in the state of the art, here there is no main spring clamped in the wheel carrier 2 and the vehicle body which is supported on one of these transverse control arms 4-6.

Rather, the still required and also present main spring element is integrated in the additional control arm 7, which extends essentially in the longitudinal direction of the vehicle and, for example or preferably, consists of a fiber composite material, so that this so-called longitudinal control arm 7 under a corresponding force effect is elastically deformable to such an extent that it can take over the function of a main spring, otherwise usually designed as a helical steel spring or as a pneumatic spring. For this purpose, this longitudinal control arm 7 consists of two, in a large area, individual control arm parts 7a, 7b, which are essentially situated in a common vertical plane. The longitudinal control arm 7 is, on one side, essentially rigidly fastened to the wheel carrier 2—here, by use of two screws 8 respectively per control arm part 7a, 7b—and, at the other end, is also essentially rigidly fastened to the vehicle body (not shown), specifically by way of a fastening element 9. The two control arm parts 7a, 7b are suitably guided together in the fastening element 9. Here, a slightly elastic fastening is also contemplated in that the end of the longitudinal control arm 7 facing away from the wheel carrier 2 is fixed in the fastening element 9 by way of a rubber layer, and is preferably vulcanized into the fastening element 9.

The drive shaft 3 is placed between the two control arm parts 7a, 7b. Furthermore, reference number 10 indicates an essentially conventional vibration damper (with an integrated stop spring 12 shown schematically, such as a compression or rebound stop spring), which is functionally connected parallel to the main spring integrated in the longitudinal control arm 7 and is supported directly between the wheel carrier 2 and the vehicle body. However, this as well as a plurality of further details, particularly of the constructive type, may be designed differently than explained above, without leaving the content of the claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle wheel suspension of a control blade design, comprising:
    three wheel-guiding control arms essentially oriented in a transverse direction of a vehicle;
    one longitudinal control arm fastened essentially rigidly to a wheel carrier and minimally limiting transverse movement of the wheel carrier relative to a vehicle body, wherein
    the longitudinal control arm is essentially rigidly fastened to the vehicle body and is configured to take over a main spring function between the wheel carrier and the vehicle body,
    the longitudinal control arm comprises two or more, in a wide area, individual control arm parts, which are essentially situated in a common vertical plane, and
    a first of the individual control arm parts of the longitudinal control arm is fastened at one end to the wheel carrier above a wheel center, a second of the individual control arm parts is fastened at one end to the wheel carrier below the wheel center, and
    the first and second control arm parts are guided together at their other ends in a common fastening element that is fastened to the vehicle body.

2. The vehicle wheel suspension according to claim 1, further comprising:
    a vibration damper having one or more integrated stop springs, wherein other than the springs integrated in the vibration damper and the main spring function of the longitudinal control arm, no further main spring element is provided between the wheel carrier and the vehicle body.

3. The vehicle wheel suspension according to claim 1, wherein the longitudinal control arm is constructed of a fiber composite material.

4. The vehicle wheel suspension according to claim 1, wherein the longitudinal control arm is slightly elastically fastened in at least one of: the fastening element and to the wheel carrier.

5. The vehicle wheel suspension according to claim 3, wherein the longitudinal control arm is slightly elastically fastened in at least one of: the fastening element and to the wheel carrier.

6. The vehicle wheel suspension according to claim 4, wherein the slightly elastic fastening is constituted by vulcanizing the longitudinal control arm into the fastening element.

* * * * *